July 9, 1940.   J. S. HILL   2,207,586
REFRIGERATED VEGETABLE STAND
Filed June 14, 1939

INVENTOR
JOSEPH STUART HILL.
BY *Albert Sperry*
ATTORNEY

Patented July 9, 1940

2,207,586

UNITED STATES PATENT OFFICE 2,207,586

REFRIGERATED VEGETABLE STAND

Joseph Stuart Hill, Ewing Township, Mercer County, N. J., assignor to C. U. Hill & Company, Incorporated, Trenton, N. J., a corporation of New Jersey Application June 14, 1939, Serial No. 279,067

3 Claims. (Cl. 62—89.6)

My invention relates to open-type refrigerated vegetable stands and the like and particularly to constructions of this character wherein the refrigerating means are so formed and arranged as to insure uniformity of cooling and uniformity of condensation of moisture upon articles located within the refrigerated space.

Open-type refrigerated vegetable stands as constructed heretofore have been of two types, namely, those in which the parts are so arranged as to maintain a quiet blanket or well of cold air about the vegetables for cooling the same, and those in which the elements are arranged to produce a circulation of cold air through and about the vegetables. The former of these arrangements avoids waste of cold air and loss in refrigerating effect but the amount of moisture condensing on the cooled vegetables is limited to that contained in the air maintained about the vegetables. For this reason there is a tendency for the vegetables to dry out and wilt even though they are kept cool.

In that type of vegetable stand wherein cold air is circulated about the vegetables the air circulation is usually induced by the use of more or different cooling elements at one point within the case than at another. This construction has the disadvantage of causing excess moisture to be deposited on the surfaces or articles with which the air first comes in contact and insufficient moisture to be deposited on those which it passes over subsequently. Thus there is a tendency for frost to form on the coils or fins first contacted by the air causing the air to be dried out before it comes in contact with the vegetables. In other cases where uneven cooling of the vegetables is effected some of the vegetables become sodden while others wilt and dry out.

In accordance with my invention these objections to constructions of the prior art are overcome and substantially uniform cooling and uniform condensation of moisture on the vegetables are attained. Moreover, the refrigeration losses and drying out of air due to circulation thereof through and over cooling coils and fins is eliminated.

In its preferred form constructions embodying my invention are provided with extended refrigerating surfaces of high heat conductivity such as "plate coils" or other means forming the exposed interior surfaces of the refrigerated space. In this way the cooling effect is distributed over a large area and is substantially uniform throughout the interior of the refrigerated space instead of being confined to localized areas such as coils of pipe or pipe fins. Isolated points maintained at temperatures low enough to dehydrate the air are replaced by extended surfaces maintained at a temperature low enough to cool the air and produce the desired circulation thereof without objectionable deposition of moisture on the refrigerated surfaces.

Furthermore the cooling surfaces employed are so arranged that they extend forward over the refrigerated space so as to cause air beneath and adjacent thereto to descend onto articles within the refrigerated space and to induce circulation of air from above the refrigerated space downward into contact with the cooled vegetables without passing directly over the refrigerating elements. In this way the air is cooled by the vegetables themselves and deposits moisture directly thereon instead of being cooled by the refrigerating elements with the resultant condensation of moisture and formation of frost on such elements. This cooling of the air in situ takes place relatively gradually so that moisture continues to be condensed from the air throughout its circulation over the vegetables and excessive moistening of the vegetables at one point or dehydrating thereof at another is avoided. Furthermore all danger of freezing the vegetables by over-cooling thereof or by circulating air at excessively low temperatures into contact therewith is eliminated and highly efficient operation is maintained.

One of the objects of my invention is to cool vegetables or other articles and to deposit moisture thereon in such a way as to insure substantially uniform cooling and condensation of moisture through the mass.

Another object of my invention is to provide a novel form of open vegetable stand with a refrigerated space and means for effecting substantially uniform cooling and moistening of articles therein.

A further object of my invention is to provide an open refrigerated vegetable stand with a space for receiving articles to be cooled and refrigerating means extending over said space and arranged to induce a flow of undehydrated air downward upon articles in said space.

Another object of my invention is to provide a new method of refrigerating vegetables wherein air retaining substantially its original moisture content is passed in contact with vegetables and cooled by the vegetables so as to deposit its moisture directly thereon.

These and other objects and features of my invention will appear from the following description thereof in which reference is made to the figures of the accompanying drawing.

Figure 1:
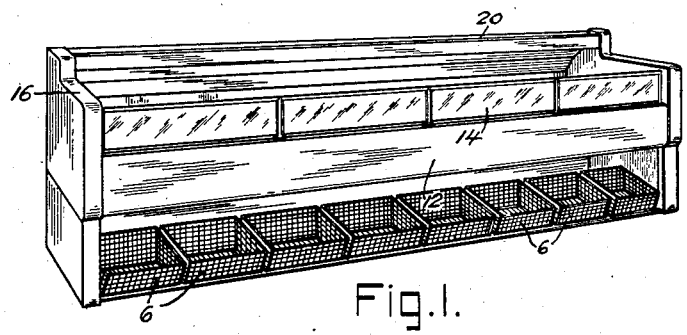
Fig. 1 is a perspective of an open vegetable stand embodying my invention.

In that form of the invention illustrated in the drawing a refrigerated vegetable stand is provided with a lower supporting base indicated generally at 2 and formed of angle members or other suitable elements of construction. The front of the base is preferably open at 4 to receive wire baskets 6 in which may be stored vegetables such as potatoes, onions or the like which do not require refrigeration for the preservation thereof.

The upper portion of the stand embodies a refrigerated space 8 for receiving perishable vegetables. This space is provided with an insulated bottom 10 and a front wall having the lower part 12 thereof formed of heat insulating material and surmounted by a glass panel 14 through which vegetables or other articles within the refrigerated space can be readily viewed. End members 16 formed of heat insulating material and a back wall 18 also formed of heat insulating material cooperate with the base and front wall to define the refrigerated space. The upper portion of the back wall 18 is provided with a projection 20 which extends forward so as to overhang the rear portion of the refrigerated space. The upper surface of the portion 20 is formed with raised marginal edges 22 and serves as a shelf upon which articles may be placed. If desired the shelf may be lined with metal or otherwise formed so that water may be placed therein to maintain products such as asparagus in a fresh condition.

Within the refrigerated space defined by the front wall 12—14, the end walls 16 and the rear wall 18 are located refrigerating means which present extended inwardly facing surfaces adapted to be maintained at substantially uniform low temperatures throughout the area thereof. As shown the refrigerating means are in the form of "plate coils" including the refrigerant carrying coils 24 and 26 and plates 28 and 30 formed of material having high heat conductivity. The plate 28 and associated coils 24 extend throughout the bottom of the refrigerated space whereas the plate 30 and associated coils 26 extend upward adjacent the rear wall 18 and forward beneath the overhanging portion 20 of the rear wall. The coils may be soldered to or otherwise held in contact with the heat conducting plates 28 and 30 so as to withdraw heat directly therefrom and to maintain the surfaces of the plates at a low and substantially uniform temperature throughout the entire area thereof. In this way localized low temperature areas are eliminated and not only are the vegetables cooled uniformly but undesirable condensation of moisture on the surface of the plates is avoided.

Figure 2:
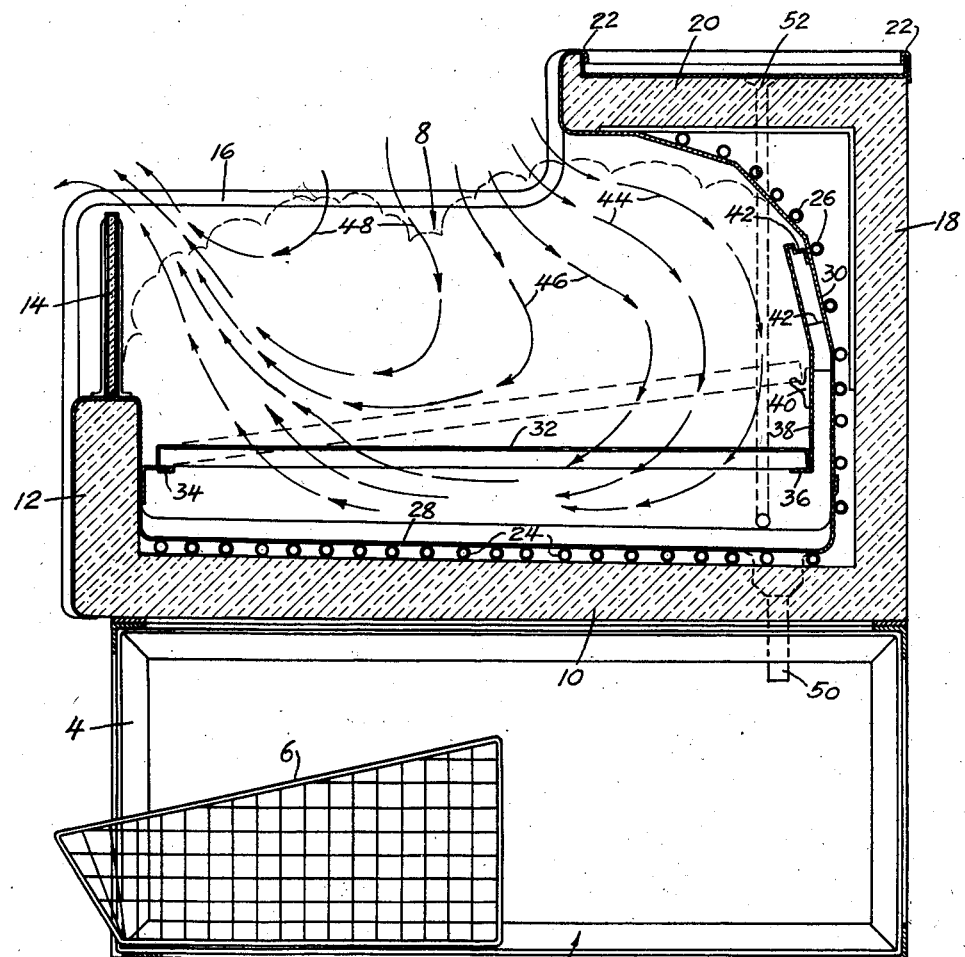
Fig. 2 is a vertical sectional view of the construction illustrated in Fig. 1.

In order to avoid any possibility of freezing the vegetables a perforated support 32 is located within the refrigerated space, the front of the support resting upon the bracket 34 attached to the inner face of the lower portion 12 of the front wall whereas the rear edge of the member 32 rests upon a bracket 36 carried by a baffle member 38. A second bracket 40 is carried by the baffle member 38 and located above the bracket 36 so that the support 32 can be positioned horizontally as shown in full lines in Fig. 2 or may be located in an inclined position as illustrated in dotted lines in Fig. 2.

The baffle member 38 is connected to the upwardly extending plate 30 of the refrigerating means and is spaced therefrom by spacing elements 42. Thus vegetables placed in the refrigerated space are held out of direct contact with the refrigerated surfaces 28 and 30, so that freezing of the vegetables cannot take place.

In operation vegetables are placed upon the perforated support 32 within the refrigerated space 8 and are cooled substantially uniformly by the refrigerating means 28 and 30. The circulation of a refrigerant through the coils 24 and 26 serves to maintain the surfaces 28 and 30 at a low temperature and to cool air within the refrigerated space and beneath the overhanging portion 20 of the rear wall. The air which is located beneath the shelf 20 and at the rear of the refrigerated space is thus cooled and flows rearward and downward following generally along the surface of the refrigerating means 30 as indicated by the arrows 44. This circulation of air induces a flow of additional or adjacent air from above the refrigerated space downward and inward as indicated by the arrows 46 so that it passes through and over the vegetables without contacting the refrigerating means and without itself being appreciably cooled to effect its circulation. However, when this additional air comes into contact with the cooled vegetables it is cooled by the vegetables and deposits moisture directly thereon. Cooling of the air by the vegetables causes it to descend further through the vegetables drawing in additional air as indicated by the arrows 48. As the air from above the refrigerated space continues to flow through and over the vegetables it is cooled gradually and so deposits its moisture gradually on those vegetables with which it comes in contact instead of depositing substantially all of its moisture on super cooled surfaces. Thus moisture is condensed uniformly on all the vegetables including those located near the bottom and front of the refrigerated space and resting on the perforated support 32 eliminating all danger of causing the vegetables to become sodden in one part of the space or dried out in another. Moreover, it is only necessary to cool the vegetables to a temperature sufficiently below the dew point of the surrounding air to insure the preservation thereof and the condensation of moisture thereon. The flow of air so induced does not pass directly over the surfaces of the refrigerating means so that the moisture content thereof remains substantially undiminished until the air comes in contact with the vegetables themselves.

In order to permit cleaning of the refrigerated space and in order to prevent moisture from collecting in the bottom of the case a drain 50 is provided and the surface of the plate 28 is inclined to conduct moisture to the drain. A drain 52 also extends downward from the shelf 20 to the plate 28 to permit cleaning of the shelf.

The form of refrigerated vegetable stand shown in the drawing and described above has been found in practice to be efficient in operation and to preserve perishable vegetables in a fresh condition for long periods of time. However it should be understood that my invention may be embodied in vegetable stands of other form and design than that illustrated and therefore the foregoing description should be considered as illustrative only and not as intended to limit the scope of my invention.

I claim:

1. An open-type vegetable stand having therein a refrigerated space the top of which is open to the atmosphere, said space being defined by a bottom and adjacent front, back and end walls extending above the bottom to enclose the sides of said space, said back wall having a portion extending upward higher than said front wall and forward over the rear of the refrigerated space in overhanging relation with respect thereto, refrigerating elements located in the overhanging portion of said rear wall and means formed of material of high heat conductivity engaged by and concealing said refrigerating elements, said means being exposed to the interior of said space and presenting an extended surface cooled by said elements and serving to cause air from above the refrigerated space to descend onto articles in said space.

2. An open-type refrigerated vegetable stand comprising a bottom, front, end and back walls extending above said bottom to define a space which is closed at the sides and open at the top to provide access to said space, said back wall extending above the front wall and having an upper portion extending forward so as to project over the rear portion of said space, refrigerating means for cooling air and the articles in said space, presenting substantially uniformly cooled surfaces extending throughout said base, back wall and overhanging portion for inducing downward flow of air at the rear of said space whereby additional uncooled and undried air from the atmosphere above the major part of said space is caused to flow downward into contact with vegetables within said refrigerated space and means for holding articles within said space out of contact with said refrigerating means.

3. An open type vegetable stand having therein a refrigerated space the top of which is open to the atmosphere, said space being defined by a bottom and adjacent front, back and end walls extending above said bottom to enclose the sides of said space, said back wall having a portion extending upward higher than the front wall and forward over the rear of the refrigerated space and into overhanging relation with respect thereto, and refrigerating means located adjacent said back wall and below said overhanging portion in position to induce a flow of uncooled and undried air downward past the front edge of said overhanging portion so that said air passes into contact with vegetables located in said space prior to the passage thereof into contact with said refrigerating means.

JOSEPH STUART HILL.